United States Patent [19]
O'Shea

[11] 3,915,937
[45] Oct. 28, 1975

[54] POLY(OXYPROPYLENE) GLYCOL BASED POLYURETHANE ELASTOMERS SUITABLE FOR AUTOMOTIVE BODY PARTS

[75] Inventor: Francis X. O'Shea, Naugatuck, Conn.

[73] Assignee: Uniroyal, Inc., New York, N.Y.

[22] Filed: May 10, 1974

[21] Appl. No.: 469,143

[52] U.S. Cl.. 260/77.5 AM; 264/328; 264/DIG. 77; 296/31 R
[51] Int. Cl.² .............. B62D 29/04; C08G 18/32; C08G 18/48
[58] Field of Search ........ 260/77.5 AP, 77.5 AM; 260/12.5 AM; 296/31R

[56] References Cited
UNITED STATES PATENTS

| | | | |
|---|---|---|---|
| 2,929,800 | 3/1960 | Hill | 260/77.5 AM |
| 3,336,242 | 8/1967 | Hampson et al. | 260/2.5 AP |
| 3,517,062 | 6/1970 | Powers | 260/77.5 AM |
| 3,620,905 | 11/1971 | Ahramjian | 260/77.5 AM |

*Primary Examiner*—H. S. Cockeram
*Attorney, Agent, or Firm*—Willard R. Sprowls, Esq.

[57] ABSTRACT

Flexible automobile exterior body parts are molded from a polyurethane elastomer prepared from a reaction mixture comprising:
 a. a polymeric diol selected from the group consisting of poly(oxypropylene) glycol and ethylene oxide "tipped" poly(oxypropylene) glycol of molecular weight of from about 1750 to about 2500;
 b. methylenebis(4-phenylisocyanate);
 c. 1,4-butanediol.

The invention also relates to this polyurethane elastomer.

3 Claims, No Drawings

POLY(OXYPROPYLENE) GLYCOL BASED POLYURETHANE ELASTOMERS SUITABLE FOR AUTOMOTIVE BODY PARTS

Flexible exterior body parts for automobiles, including parts associated with energy-absorbing bumper systems such as sight shields, fender extensions and full fascia front and rear ends, require a material with a particular set of properties. The material must be capable of flexing under impact and then returning to its original shape. Therefore, it must be elastomeric in nature. It must have strength as typified by high tensile strength and high tear strength.

In addition, there are two more stringent requirements. It must be capable of withstanding dynamic impact at −20° F. and it must be resistant to distortion at 250° F. The latter requirement is imposed by typical conditions under which painted pieces are dried.

One class of materials which has been used for this purpose is polyurethane elastomers. Polyurethane elastomers are "block" type polymers resulting from the reaction of a polymeric diol of molecular weight of from about 500 to 5000 with a diisocyanate and a low molecular weight difunctional compound commonly referred to as the "chain extender." The chain extender has a molecular weight below 500 and generally below 300.

The polymeric diol is recognized as the "soft" segment of the elastomer, conferring elasticity and softness to the polymer. Typically, this component has a molecular weight of about 1000 to 2000 and may be a poly(alkylene ether) glycol such as poly(tetramethylene ether) glycol or poly(oxypropylene) glycol, a polyester diol, a polycaprolactone diol or polybutadiene diol.

The combination of the diisocyanate and the chain extender comprises the "hard" segment of the elastomer, contributing rigidity and strength. Typical diisocyanates include 2,4-tolylene diisocyanate and methylenebis(4-phenylisocyanate). The chain extenders are typically diamines or diols. Typical diols which may be used are listed, for example, in U.S. Pat. Nos. 3,233,025 (col. 4, lines 20–26), 3,620,905 (col. 2, lines 53–59) and 3,718,622 (col. 2, lines 10–18).

While polyurethane elastomers as a class have excellent tear strength and tensile strength and can be designed to the required modulus and elongation, not all polyurethane elastomers can meet the two requirements of low temperature impact resistance and resistance to heat distortion. In fact, a polyurethane elastomer based on poly(oxypropylene) glycol as the polymer diol and 1,4-butanediol as the chain extender has not yet been used for flexible automobile body parts because of the previous deficiencies of such an elastomer in these two areas. It is generally recognized (N. E. Rustad and R. G. Krawiec, *Rubber Age*, Nov. 1973, pp. 45–49) that elastomers based on poly(oxypropylene) glycols have poorer low temperature properties than those based on poly(tetramethyleneether) glycol, another polyol used in polyurethane elastomers but higher in cost. One known way to improve the low temperature properties is to increase the molecular weight of the polyol while keeping the mol ratios of ingredients constant. Unfortunately, while the low temperature properties are indeed improved, the hardness and rigidity are normally lowered markedly. See Table II, page 47 of the Rustad et al. article.

I have now discovered that, by the use of a unique set of formulation variables, it is possible to design a poly(oxypropylene) glycol based elastomer suitable for automobile flexible exterior body parts. Such a material can be prepared from a polyol of approximately 1750 to 2500 molecular weight, methylenebis(4-phenylisocyanate) and 1,4-butanediol, the molar ratio of butanediol to polyol being about 3.0:1 to about 9.0:1. It was most unexpected to be able to make hard elastomers with the necessary high and low temperature properties from poly(oxypropylene) glycol.

While the specific formulation for a poly(oxypropylene) glycol based elastomer necessary to achieve the proper combination of properties has not been described previously, there as appeared a paper describing a similar concept applied to flexible automobile body parts using elastomers based on polycaprolactone diol as the polyol. This paper, by F. E. Critchfield, J. V. Koleske and C. G. Seefried, Jr., was presented at the Automobile Engineering Meeting of the Society of Automotive Engineers in Detroit, Michigan during the week of May 14–18, 1973. Summarizing their data on the polycaprolactone diol based elastomers, the authors stated "for automotive elastomer applications, the thermoplastic polyurethanes based on an approximately 2000 $\overline{M}_n$ diol are more desirable since they show less modulus-temperature dependence in the use region." They also concluded: "Apparently at similar hard segment concentrations, the molecular weight of the urethane polymer soft segment has a greater effect on the temperature dependence of physical properties than the molecular length of the hard segment sequences." They attributed the unique properties of these materials to be the result of incompatibility on a microscopic scale between the hard and soft segments. In turn, "Incompatibility quite probably is due to the molecular weight of the soft segment being high enough to be immiscible in a thermodynamic sense with the hard segment."

EXPOSITION OF THE INVENTION

Completely independently of the paper last mentioned above, I have found that polyurethane elastomers suitable for the preparation of flexible automobile exterior body parts may be obtained from the reaction of a mixture comprising:

a. a polymeric diol selected from the group consisting of poly(oxypropylene) glycol and ethylene oxide "tipped" poly(oxypropylene) glycol of molecular weight from about 1750 to about 2500 (preferably about 2000);

b. methylenebis(4-phenylisocyanate);

c. 1,4-butanediol.

Suitable elastomers are those which have a hardness of about 40 to 55 Shore D, preferably 45 to 50 Shore D. They should have an elongation greater than 300%, an ultimate tensile strength of about 3000 psi or greater and a Die C tear strength of 500 pli or greater.

Painted parts made from these elastomers must remain intact under a 5 MPH impact at −20° F. To simulate the dynamic conditions involved in a 5 MPH impact to −20° F., a drop impact test system was developed. The unit consists basically of a vertical guide tube, a drop weight of appropriate design and associated instrumentation.

Polymers to be evaluated were moled into 2 inch × 6 inch × 0.08 inch specimens, which were conditioned in an environmental chamber to −20° F. and then fitted into two slots 3 inches apart so that the sample formed an inverted "U" with a total flexed height of 2 inches. The sample was impacted at its center line with a force of 50 ft. lbs., the weight traveling at 5 MPH at impact. Drop height above the top of the sample was 38 inches. The drop weight is an 18 inch long cylinder weighing 16 lbs. It is 2.5 inches in diameter for 16.5 inches of its length and then tapers to a blunt end, which is the striking surface.

Polymers with inadequate low temperature impact resistance invariably fractured in this test. This test correlates well with the automobile manufacturer's testing where full size parts are made and mounted on a car or a portion of a car. After cooling to −20° F., the full size part is hit with a pendulum weight which is traveling at 5 MPH.

Parts made from these elastomers must also withstand paint oven temperatures of 250° F. without objectionable shrinkage or distortion. To evaluate materials for heat distortion characteristics, a sag resistance test (Heat Test O'S) was developed. The apparatus consists of a jig to hold a 2 inch × 6 inch × 0.08 inch injection molded sample in a horizontal plane. The sample is mounted with 4 inches suspended beyond the edge of the clamp. The jig with the sample is then placed in an oven pre-heated at 250° F. for one-half hour. The amount of sag is the difference in height from the end of the sample to a horizontal plane before and after exposure to heat. Experience with a material that was acceptable to automobile manufacturers has shown that polyurethane elastomers with a sag less than 2.0 inches by this test will perform satisfactorily in paint bake ovens used to cure painted large automotive parts.

To demonstrate the effect of the polyol molecular weight on the required properties, two elastomers were prepared at a hardness of about 40 Shore D. One elastomer was prepared with a 1000 molecular weight polyol, the second from a 2000 molecular weight polyol. Both polyols were poly(oxypropylene) glycols "tipped" with ethylene oxide. The ethylene oxide content was about 10% by weight, with about 50% of the polyol hydroxyl groups being primary. These materials are described in Example 1. It is shown that the elastomer based on the 1000 molecular weight polyol failed the low temperature impact test while the material based on the 2000 molecular weight polymer passed the test.

In a similar manner, two elastomers were prepared at a hardness of 45 Shore D and injection molded as described in Example 2. The polymer based on the 1000 molecular weight polyol failed the low temperature impact and heat distortion tests, while the polymer based on the 2000 molecular weight polyol passed both tests. A 50 Shore D elastomer meeting the required properties is described in Example 3.

An elastomer based on an untipped poly(oxypropylene) glycol of 2000 molecular weight is described in Example 4.

While the preferred molecular weight of the polyol is about 2000, it is recognized that the molecular weight may be somewhat below or above this figure and still give acceptable elastomers. The lower limit of acceptable molecular weight is 1750, with an elastomer prepared from 1500 molecular weight polyol being not completely acceptable with respect to low temperature impact (Example 5). Similarly, the upper limit of acceptable molecular weight is 2500. Polymer based on 3000 molecular weight polyol has lowered physical properties (Example 6). This is believed to be due to separation of soft and hard phases early enough in the polymerization to immobilize reactive end groups and thereby inhibit chain extension.

The molar ratio of chain extender to polyol which may be used depends on the molecular weight of the polyol. It ranges from 3.0:1 for a 1750 molecular weight polyol to 9.0:1 for a 2500 molecular weight polyol. The preferred molar ratio of chain extender to polyol for a 2000 molecular weight polyol ranges from 3.5:1 to 5.0:1, with 4.0:1 − 4.5:1 being preferred. The NCO/OH ratio used to prepared the elastomer may range from 0.95 to 1.2, with 1.00 to 1.05 being preferred.

Although the elastomer may be prepared by a "one shot" technique in which the polyol, chain extender and isocyanate are reacted together in one step, this method is not preferred because of separation of the reacting mass into imcompatible phases resulting from the difference in reactivity between the polyol and the chain extender. Although this may be overcome to a large extent by the careful choice of a catalyst, it is preferred to prepare the elastomer by the prepolymer process in which the polyol is first reacted with the diisocyanate and subsequently reacted with the chain extender in a separate step. A catalyst may or may not be used as desired. Some examples of useful catalysts are N-methyl-morpholine, N-ethyl-morpholine, triethyl amine, triethylene diamine (Dabco), N,N'-bis(2-hydroxylpropyl)-2-methyl piperazine, dimethyl ethanol amine, tertiary amino alcohols, tertiary ester amines, stannous octoate, dibutyl tin dilaurate and the like.

"Tipping" of poly(oxypropylene) glycol with ethylene oxide provides the glycol with primary hydroxyl end groups. These "tipped" diols provide greater reactivity with diisocyanates with such is desired. This technique is described in "Advances in Urethane Science and Technology," by K. C. Frisch and S. L. Reegan, Technomic Publishing Company, Westport, Conn., 1973, pages 188-193, which pages are incorporated herein by reference.

EXAMPLE 1

Two elastomers, one from a 1000 molecular weight polyol and one from a 2000 molecular weight polyol, were prepared in the following manner. All parts are by weight.

Elastomer A

Three hundred sixty parts of a 1040 molecular weight poly(oxypropylene) glycol tipped with ethylene oxide (50% primary hydroxyl) were dried at 100° C. under vacuum (2 mm. Hg) for 30 minutes. The polyol then was cooled to 50° C. under a blanket of dry nitrogen and 260 parts of 4,4'-methylenebis(phenyl isocyanate) were added. The mixture then was heated at 80° C. for 2 hours under dry nitrogen. Analysis of the resultant prepolymer showed it to have an amine equivalent of 472.

To 150 parts of the prepolymer at 110° C. were added 13.6 parts of 1,4-butanediol at 60° C. The reactants were well mixed. The product was compression molded into a 8 inch × 8 inch × 0.08 inch plaque and cured for 1 hour at 120° C. The cured elastomer was then postcured overnight at 110° C. The ratio of equivalents of polyol/chain extender/diisocyanate in the final elastomer was 1/1.9/3.

Elastomer B

Using an identical procedure, 316 parts of a 2080 molecular weight polyol of the same structure were allowed to react with 179 parts of 4,4'-methylenebis(phenyl isocyanate). The amine equivalent of the resultant prepolymer was 466. Similarly, 150 parts of the prepolymer were cured with 13.7 parts of 1,4-butanediol. The ratio of equivalents of polyol/chain extender/diisocyanate in the final elastomer was 1/3.5/4.7.

Physical Properties

The properties of the elastomers were obtained.

|  | Elastomer A | Elastomer B |
|---|---|---|
| Hardness, Shore D | 40 | 40 |
| 100% Modulus | 860 | 1000 |
| 300% Modulus | 1740 | 1560 |
| Tensile Strength, psi | 3590 | 3480 |
| Elongation, % | 540 | 690 |
| Die C Tear, lbs./in. | 458 | 533 |
| −20° F. Impact | FAIL | PASS |

The results show that Elastomer B meets the automotive low temperature requirement whereas Elastomer A does not.

EXAMPLE 2

In a manner similar to that described in Example 1, the 1040 molecular weight polyol, butanediol and 4,4'-methylenebis(phenyl isocyanate) were allowed to react at an equivalents ratio of 1/2.38/3.50. The product was open cast and cured for 20 minutes at 149° C. It was then diced and injection molded into 2 inch × 6 inch × 0.08 inch plaques. (Elastomer C)

Similarly, the 2080 molecular weight polyol was converted to an elastomer using a 1/4.27/5.50 equivalents ratio (Elastomer D).

Physical properties of the elastomers were as follows:

|  | Elastomer C | Elastomer D |
|---|---|---|
| Hardness, Shore D | 45 | 45 |
| 100% Modulus | 1400 | 1470 |
| 300% Modulus | 2430 | 2120 |
| Tensile Strength, psi | 3280 | 2960 |
| Elongation, % | 400 | 500 |
| Die C Tear, lbs./in. | 550 | 720 |
| −20° F. Impact | FAIL | PASS |
| Heat Sag, inches | > 2" | 1½" |

The results show the superiority of Elastomer D over Elastomer C in both low temperature impact strength as well as in heat sag resistance. It was also noted that Elastomer C stuck badly with some distortion when injection molded, while Elastomer D molded without difficulty.

EXAMPLE 3

In a manner similar to that described in EXAMPLE 2, a 2000 molecular weight poly(oxypropylene) glycol tipped with ethylene oxide (50% primary hydroxyl) was converted to an elastomer using a polyol/1,4-butanediol/4,4'-methylenebis(phenyl isocyanate) equivalents ratio of 1/4.7/6.0.

Physical properties of the injection molded elastomer were as follows.

| Hardness, Shore D | 50 |
|---|---|
| 100% Modulus | 1880 |
| 300% Modulus | 2940 |
| Tensile Strength, psi | 3390 |
| Elongation, % | 400 |
| Die C Tear, lbs./in. | 810 |
| −20° F. Impact | PASS |
| Heat Sag, inches | 1 1/16" |

EXAMPLE 4

In a manner similar to that described in Example 2, 2000 molecular weight poly(oxypropylene)glycol was converted to an elastomer using a polyol/1,4-butanediol/4,4'-methylenebis(phenyl isocyanate) equivalents ratio of 1/4.27/5.5.

Physical properties of the injection molded elastomer were as follows:

| Hardness, Shore D | 43 |
|---|---|
| 100% Modulus | 1820 |
| 300% Modulus | 2810 |
| Tensile Strength, psi | 3200 |
| Elongation, % | 400 |
| Die C Tear, lbs./in. | 730 |
| −20° F. Impact | PASS |
| Heat Sag, inches | 1 10/16" |

This example demonstrates that a 2000 molecular weight untipped poly(oxypropylene) glycol produces an elastomer with acceptable properties.

EXAMPLE 5

In a manner similar to that described in Example 1, a 1500 molecular weight poly(oxypropylene) glycol tipped with ethylene oxide (50% primary hydroxyl) was converted to an elastomer using a polyol/1,4-butanediol/4,4'-methylenebis(phenyl isocyanate) equivalents ratio of 1/3.3/4.5. Two compression molded samples had the following properties:

|  | Sample A | Sample B |
|---|---|---|
| Hardness, Shore D | 40 | 40 |
| 100% Modulus | 1480 | 1480 |
| 300% Modulus | 3090 | 3070 |
| Tensile Strength, psi | 4560 | 4300 |
| Elongation, % | 420 | 370 |
| Die C Tear, lbs./in. | 690 | 632 |
| −20° F. Impact | PASS | FAIL |

Although the properties were generally acceptable, the failure of one sample in the low temperature impact test indicates that 1500 molecular weight for the polyol segment is not completely acceptable with regard to low temperature properties.

EXAMPLE 6

In a manner similar to that described in Example 1, a 3000 molecular weight poly(oxypropylene) glycol was converted to an elastomer using a polyol/1,4-butanediol/4,4'-methylenebis(phenyl isocyanate) equivalents ratio of 1/7.6/9.0. Because of the relatively high molecular weight of the polyol and the high level of equivalents of chain extender and isocyanate, this system turned white early in the cure and tended to give poor "cheezy" cures. This is believed to be due to separation of soft and hard phases early enough in the polymerization to immobilize reactive end groups and thereby inhibit chain extension. One sample prepared, using about 0.1 part of triethylene diamine catalyst per 100 parts of prepolymer, gave the following compression molded properties:

| | |
|---|---|
| Hardness, Shore D | 35 |
| 100% Modulus | 1370 |
| 300% Modulus | — |
| Tensile Strength, psi | 2550 |
| Elongation, % | 280 |
| Die C Tear, lbs./in. | 558 |

The results show that a 3000 molecular weight for the polyol segment is not completely acceptable with respect to attaining desirable strength properties and elongation.

The automobile flexible body parts, which are a desired end-product of this invention, are fabricated by injection molding using the already prepared polyurethane elastomer as the molding material. In this method, the elastomer is made into small dice or pellets suitable for feeding to injection molding machines. Using the same preformed material, a part may also be prepared by extrusion techniques including profile extrusion and sheet extrusion followed by vacuum forming.

Alternatively, the part may be formed by the method termed "liquid reaction molding," in which the reactants are rapidly injected into a mold wherein they cure to form the shaped elastomeric article directly. In this method, the polyol, chain extender and diisocyanate may be reacted in one step (one shot method) or the polyol and diisocyanate may be prereacted and then injected along with the chain extender to form the molded article (prepolymer method).

What is claimed is:

1. A polyurethane elastomer which is a reaction product of: (1) a prepolymer formed by the interaction of a polymeric diol selected from the group consisting of poly(oxypropylene) glycol and poly(oxypropylene) glycol tipped with about 10% by weight of ethylene oxide and having a molecular weight of from about 1750 to about 2500 and methylenebis(4-phenyl isocyanate); and (2) 1,4-butanediol, the NCO/OH equivalents ratio being from about 0.95 to about 1.20 and the molar ratio of said butanediol to said polymeric diol being from about 3.0:1 to about 9.0:1; said elastomer having a hardness of about 40 to 55 Shore D, an elongation of greater than 300%, an ultimate tensile strength of at least 3000 psi and a Die C tear strength of at least 500 pli.

2. A polyurethane elastomer as in claim 1 in which the molecular weight of said polymeric diol is about 2000.

3. A shaped article prepared from the polyurethane elastomer of claim 1 and characterized, when having a thickness of 0.08 inch, by remaining intact under a 5 mile per hour impact at −20° F. and by having a sag of less than 2 inches as determined by the Heat Test O'S.

* * * * *